May 3, 1966 T. V. McNAMARA ETAL 3,248,962

MECHANICAL DEVICE

Filed March 26, 1963 7 Sheets-Sheet 1

INVENTOR.
THOMAS V. McNAMARA &
RONALD EUGENE TOMPKINS
BY
Woodhams, Blanchard & Flynn
ATTORNEYS

MECHANICAL DEVICE

Filed March 26, 1963 7 Sheets-Sheet 2

INVENTORS
THOMAS V. McNAMARA
RONALD EUGENE TOMPKINS
BY
Woodhams, Blanchard & Flynn
ATTORNEYS

MECHANICAL DEVICE

Filed March 26, 1963

7 Sheets-Sheet 3

INVENTORS.
THOMAS V. McNAMARA
RONALD EUGENE TOMPKINS
BY
Woodhams, Blanchard & Flynn
ATTORNEYS May 3, 1966 T. V. McNAMARA ET AL 3,248,962

MECHANICAL DEVICE

Filed March 26, 1963 7 Sheets-Sheet 4

INVENTORS
THOMAS V. McNAMARA
RONALD EUGENE TOMPKINS
BY
Woodhams, Blanchard & Flynn
ATTORNEYS

MECHANICAL DEVICE

INVENTORS
THOMAS V. McNAMARA
RONALD EUGENE TOMPKINS
BY
Woodhams, Blanchard & Flynn
ATTORNEYS INVENTOR.
THOMAS V. Mc NAMARA
RONALD EUGENE TOMPKINS
BY
Woodhams, Blanchard and Flynn
ATTORNEYS

MECHANICAL DEVICE

Filed March 26, 1963

INVENTORS.
THOMAS V. McNAMARA
RONALD EUGENE TOMPKINS
BY
Woodhams, Blanchard and Flynn
ATTORNEYS 3,248,962
Patented May 3, 1966

3,248,962
MECHANICAL DEVICE

Thomas V. McNamara, Cooper Township, Kalamazoo County, and Ronald Eugene Tompkins, Portage Township, Kalamazoo County, Mich., assignors to Eaton Manufacturing Company, Cleveland, Ohio, a corporation of Ohio Filed Mar. 26, 1963, Ser. No. 268,153
7 Claims. (Cl. 74—339)

This invenion relates to control means for shiftable gearing and it relates particularly to the predictor type of control means wherein a shift-initiating signal is given slightly ahead of the point of actual synchronization of the shiftable members being engaged.

In United States Patent No. 2,943,502, issued July 4, 1960, to Charles M. Perkins and Thomas V. McNamara, and assigned to the same assignee as the present application, there is set forth a system for initiating the shifting of a pair of shiftable members slightly ahead of the point of actual synchronization in order that the time required for movement of mechanical parts will be taken up as the synchronization process is completed whereby the shiftable parts will be engaged either exactly at the point of actual synchronization or slightly ahead of such point. This system has subsequently been further developed and refined and such developments and refinements have been illustrated and described in further patent applications, all assigned to the same assignee of the present application and including Patent No. 2,943,719, issued to Thomas V. McNamara and Charles M. Perkins, Serial No. 39,064, filed June 27, 1960, by Ralph L. Jaeschke, now Patent No. 3,103,826, issued September 17, 1963, and Serial No. 123,608, filed July 11, 1961, by Thomas V. McNamara and Chales M. Perkins, now Patent No. 3,171,300, issued on March 2, 1965.

However, in all of these prior devices the shift signal was given as the parts approached synchronization from the direction of either an upshift or a downshift and the shift then completed accordingly.

This system as previously set forth has worked to a high degree of satisfaction in a wide number of installations but it has been noted that where applied to extremely heavy equipment, such as earth movers, or other situations where extremely high rates of change of r.p.m. were encountered in the shiftable members, the downshift sequence presented a problem which occasionally prevented the completion of a shift. Specifically, where the period of prediction was set somewhat short to handle very fast rates of change of r.p.m., but the rate of change of the speed of the shiftable parts became in a given instance even higher than that expected, the initiation of a shift was not far enough ahead of the point of actual synchronization so that the velocities of the shiftable parts to be engaged went past each other prior to the moment of interengagement. Thus, the changes in velocity of such parts at the moment of attempted interengagement were going away from each other at a high rate with a consequent failure of the shift.

Attempts have been made to correct this situation by diminishing the time of prediction even further but the rates of change of r.p.m. in these situations have been so great, and often not the same from one shift to another, that the period of prediction could not be controlled with sufficient accuracy by this method. Accordingly, this problem has remained unsolved heretofore and has constituted a serious disadvantage in the otherwise successful operation and acceptance by the trade of this type of shift control.

Accordingly, the objects of the invention include:

(1) To provide a control for shiftable, interengageable toothed elements of the type used in change speed gear sets which control is adaptable for handling shifts occurring under conditions of very high rates of change of r.p.m. in at least one of the interengageable elements;

(2) To provide apparatus, as aforesaid, which would be particularly adaptable to automotive-type transmissions intended for operation under conditions of extremely heavy loads, such as earth movers;

(3) To provide apparatus, as aforesaid, which will embody the broad principles set forth in Patent No. 2,943,502 wherein the approach of synchronization is sensed by suitable means and the shifting operation is thereby initiated at a point ahead of synchronization but without encountering the problems presently experienced in extremely rapid downshift operations where the point of synchronization may be passed before the interengageable parts are moved into interengagement with each other;

(4) To provide apparatus, as aforesaid, which will conduct an upshift in the same manner as set forth in Patent No. 2,943,502 but which will conduct the drownshift in a manner which will prevent the occurrence of the problem above set forth;

(5) To provide apparatus, as aforesaid, wherein the relative speeds of the interengageable elements in a downshift are deliberately permitted to pass the point of synchronization after which means are initiated similar to that used in an upshift to bring said speeds together and complete the shift;

(6) To provide apparatus, as aforesaid, which on an upshift will give an upshift prediction signal for completing the interengagement of the parts in the manner set forth in Patent No. 2,943,502 but which on a downshift will give no signal until the parts have passed the point of synchronization and will then give a signal in the same manner as provided for an upshift whereupon the parts are again brought into synchronization but from an upshift direction and the shift is completed in the same manner as for an upshift;

(7) To provide apparatus, as aforesaid, which has a minimum of difference from the apparatus used previously whereby adoption of the principles of the present invention can be accomplished with a minimum of changes in the parts required for such purpose;

(8) To provide apparatus, as aforesaid, which will be fully reliable under all conditions of operation, which will be free from an unreasonable number of parts requiring delicate adjustment and which accordingly will be easy and inexpensive to maintain in good operating condition, which will not be unreasonably expensive in its original manufacture and which will give long and trouble-free service.

Other objects and purposes of the invention will be apparent to persons acquainted with apparatus of this general type upon reading the following disclosure and inspection of the accompanying drawings.

Figure 4A:
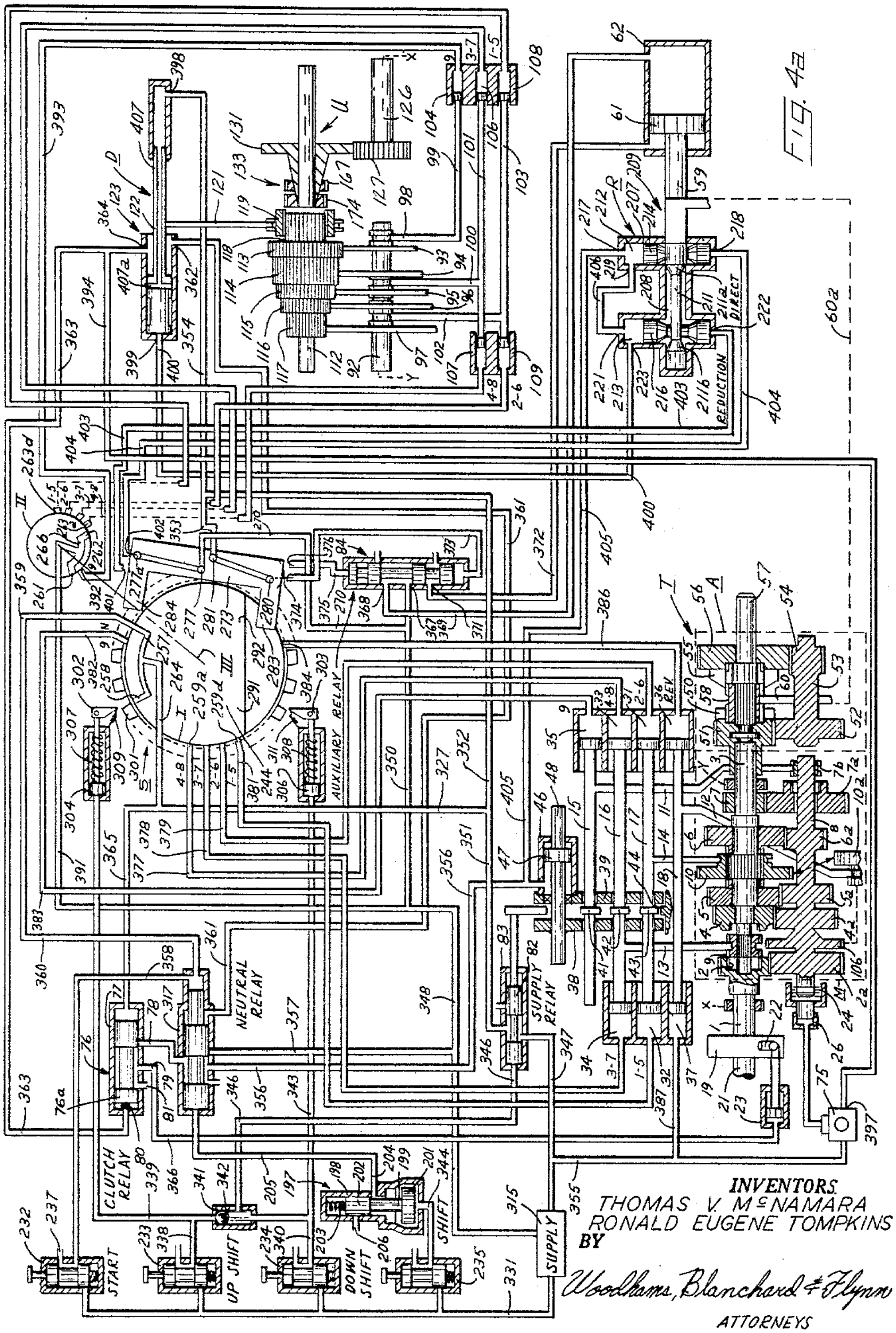

FIGURE 4*a* is a schematic diagram of the apparatus embodying the invention and showing the system in its "at rest," or "neutral" position.

Figure 4B:
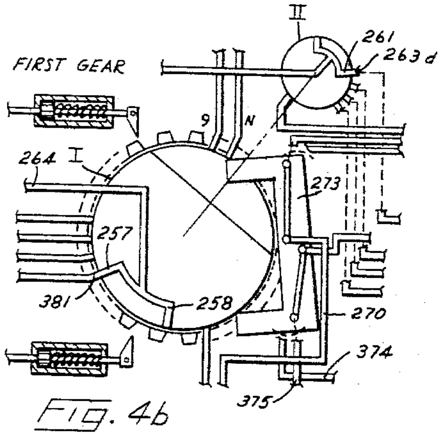

FIGURE 4*b* is a schematic diagram of a portion of the system shown in FIGURE 4*a* and showing same upon the completion of a shift into first gear position.

Figure 4C:
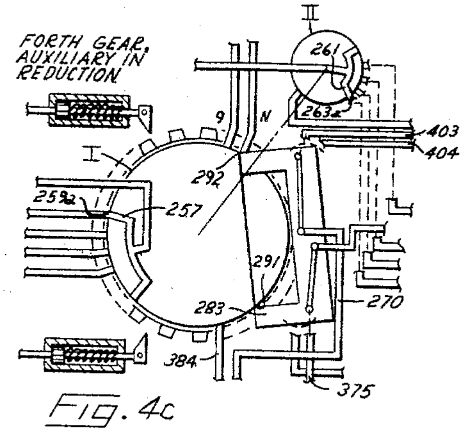

FIGURE 4*c* is a schematic diagram of a portion of the apparatus shown in FIGURE 4*a* and showing same in the fourth gear position.

Figure 4D:
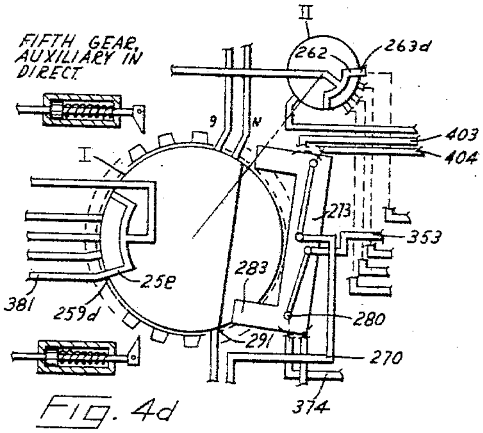

FIGURE 4*d* is a schematic diagram similar to FIGURE 4*c* and showing the parts in position corresponding to fifth gear position.

Figure 5:
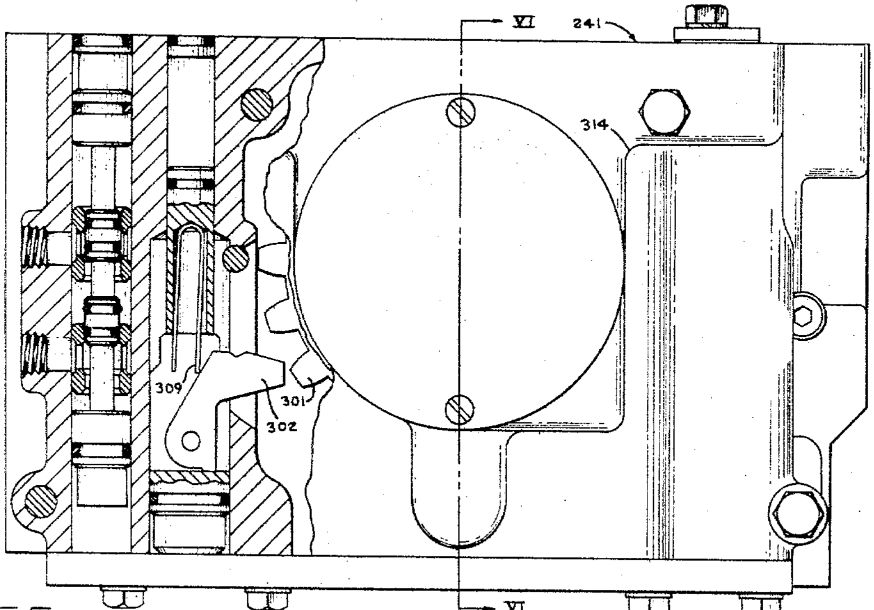

FIGURE 5 is a partially broken, top plan view of the selector valve apparatus utilized in the invention.

Figure 6:
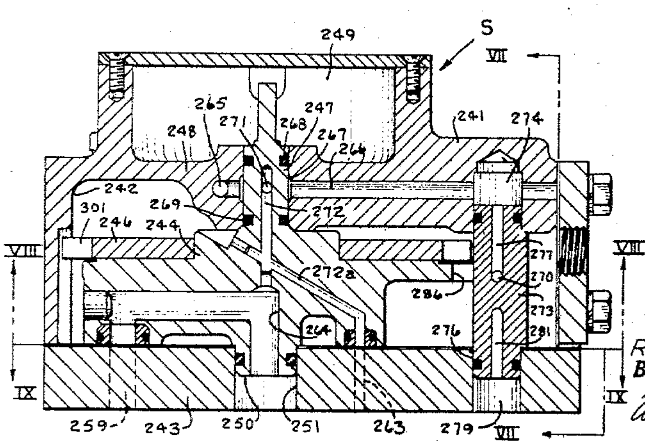

FIGURE 6 is a sectional view taken on the line VI—VI of FIGURE 5.

Figure 7:
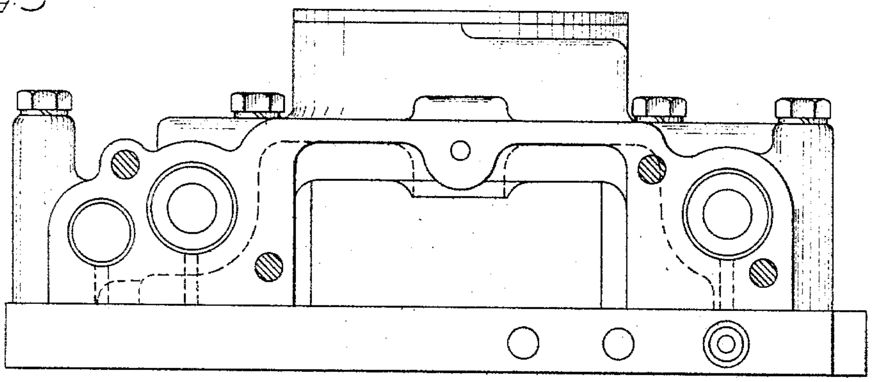

FIGURE 7 is a partially sectional, partially elevational view of the selector valve as viewed on and from the line VII—VII of FIGURE 6.

Figure 8:
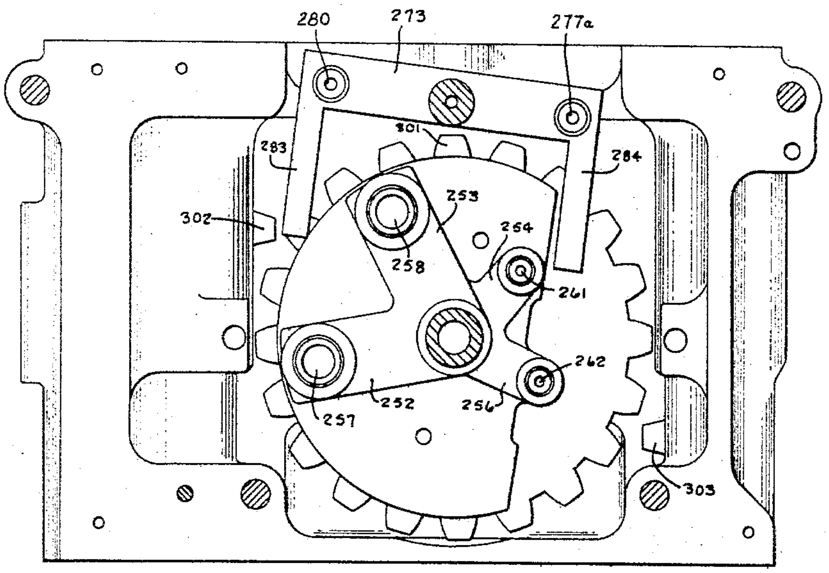

FIGURE 8 is a sectional view taken on the line VIII—VIII of FIGURE 6.

Figure 9:
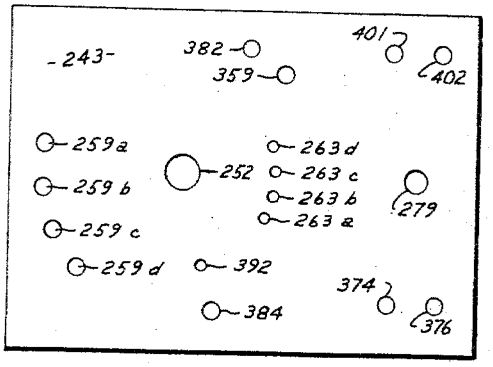

FIGURE 9 is a section taken on the line IX—IX of FIGURE 6.

Figure 10:
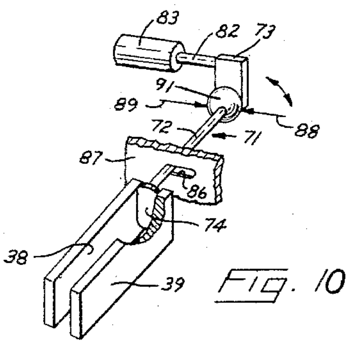

FIGURE 10 is an oblique schematic view of the structure for operating the supply relay valve.

Figure 11:
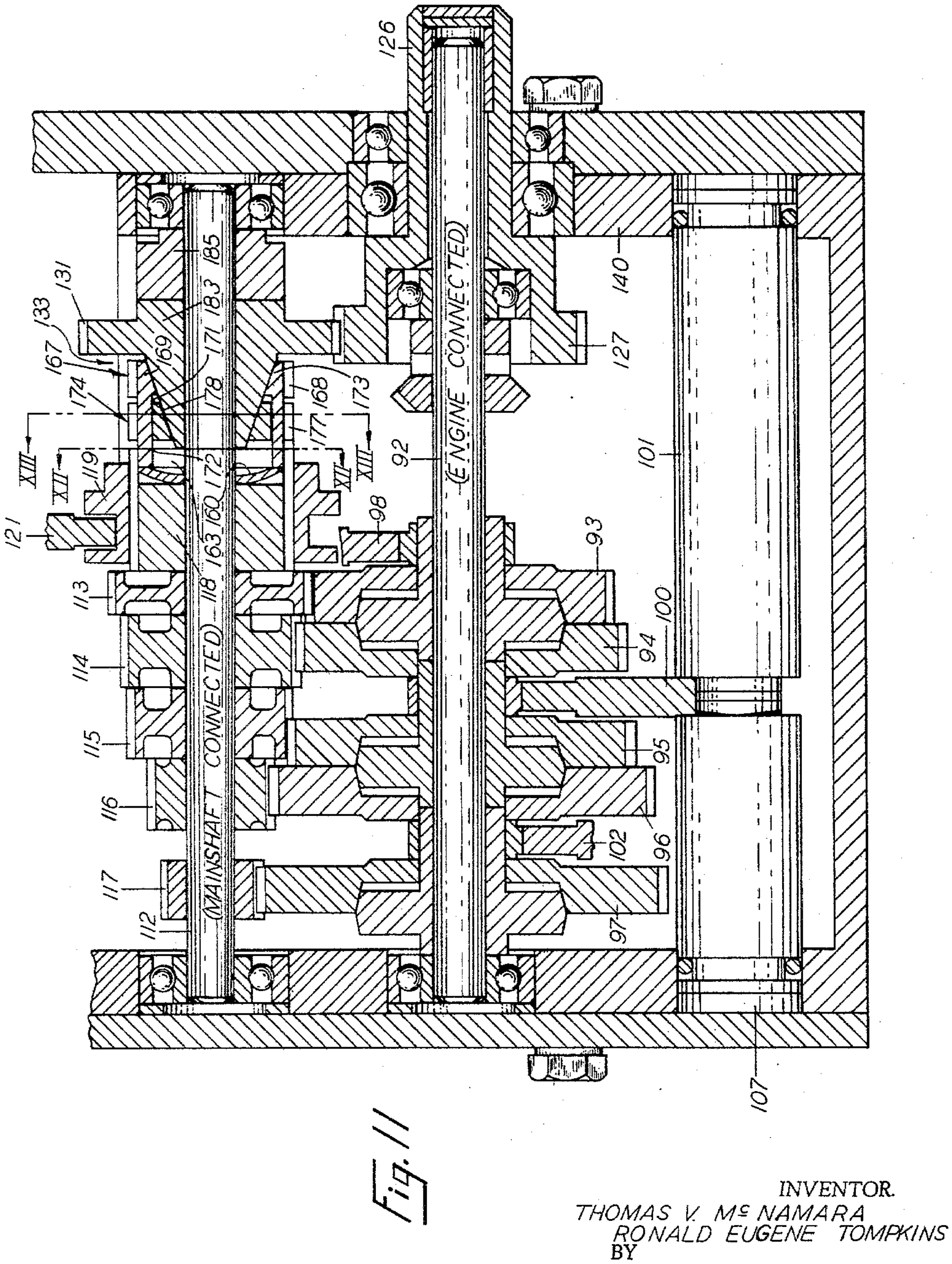

FIGURE 11 is a sectional view through the detector unit.

Figure 12:
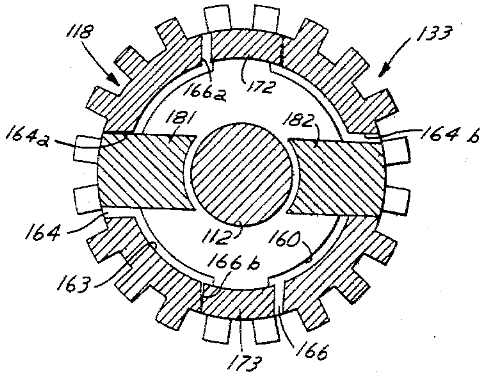

FIGURE 12 is a sectional view taken on the line XII—XII of FIGURE 11.

Figure 13:
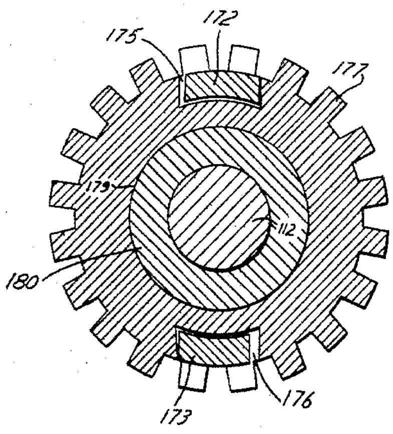

FIGURE 13 is a sectional view taken on the line XIII—XIII of FIGURE 11.

Figure 14:
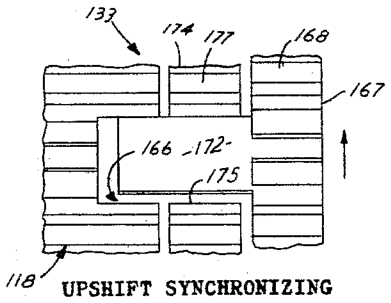

FIGURE 14 is a fragmentary showing of a portion of the synchronizing mechanism in one position of operation.

Figure 15:
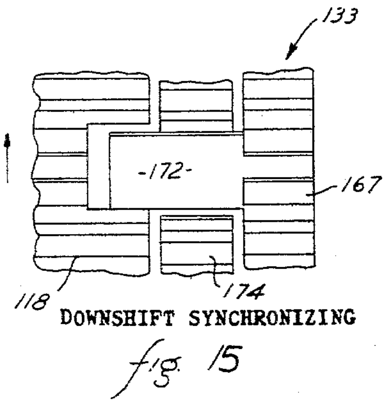

FIGURE 15 is a fragmentary portion of the same mechanism shown in FIGURE 14 in another position of operation.

Figure 16:
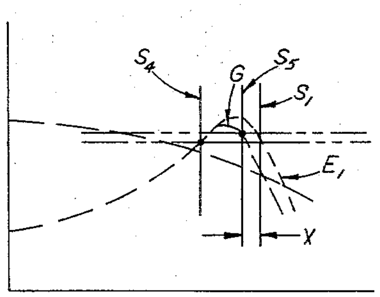

FIGURE 16 represents further velocity-time relationships in a downshift sequence.

GENERAL DESCRIPTION

In general, the invention constitutes apparatus by which a shift signal is given in connection with an upshift when the relative speeds of the shiftable parts are ahead of the point of their actual synchronization in the same manner as set forth in the previous practice, such as shown in Patent No. 2,943,502. In the downshift, however, the downshift signal provided by the previous practice is eliminated and the velocities of the interengageable parts are permitted to pass the point of synchronization so that the peripheral speed of the engine driven toothed element is greater than the peripheral speed of the ground connected toothed element. This brings the parts into the same speed relationships as exist in connection with an upshift. Thereupon an upshift signal is given in the same manner as in an actual upshift sequence, braking means are applied to the engine driven part in the same manner as in an ordinary upshift sequence and the parts are synchronized from an upshift direction and the shift is completed.

DETAILED DESCRIPTION

Inasmuch as the concept of the invention may be embodied in a wide variety of different specific items of apparatus, attention will be directed first toward the system as such and then followed by a description of one specific and preferred embodiment.

While the principles of the invention are applicable to a wide variety of specific different uses, they have at the present time found their greatest commercial application in heavy-duty vehicles such as heavy trucks and earth movers. Accordingly, for convenience in illustration, reference will be made to terminology and problems occurring in connection with such installations but it will be clearly and expressly understood that such specific reference to vehicles and earth movers is for illustrative purposes only and shall not be considered as limiting.

Figure 1:
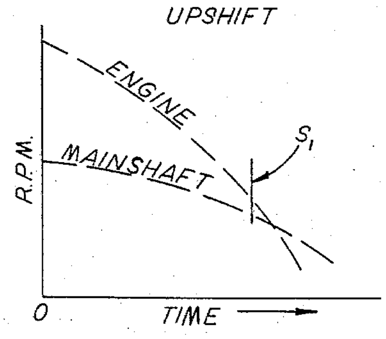
FIGURE 1 is a schematic indication of the velocity-time relationships existing between an engine connected shiftable element and a ground connected shiftable element in an upshift carried out in an automotive device and with a transmission operating in the manner set forth in the above-mentioned patents and patent applications.

Referring to FIGURE 1, there is shown a relative time-speed diagram occurring in an upshift as practiced in the previous art, as exemplified in Patent No. 2,943,502, as well as the other patent and patent applications above referred to. In this diagram the main shaft speed is shown as diminishing somewhat during the period of time required to accomplish the shift, the zero time point being taken at a moment when the driving power is removed from the main shaft, that is, the ground connected shaft, of the transmission.

Simultaneously, the speed of the engine connected unit is diminished either by merely releasing the speed control of the engine or by the application of a brake, such as a countershaft brake, by which the speed of the engine connected parts is more rapidly diminished than would occur from its own normal deceleration. At a point slightly ahead of synchronization, indicated by the line $S_1$ in FIGURE 1, the speed-sensing elements are caused to react to the approach of synchronization and give a shift-initiating signal. Thus, the shift is initiated slightly ahead of the actual point of synchronization and the interengagement of the parts then occurs either slightly ahead of or at the point of actual synchronization.

Figure 2:
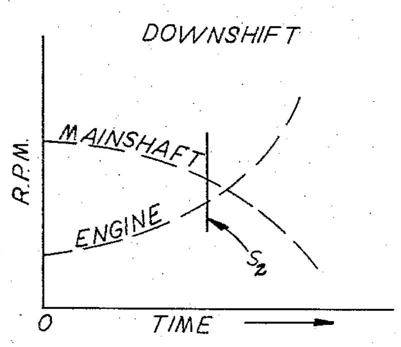
FIGURE 2 represents the velocity-time relationships in a downshift carried out with the same equipment utilized in connection with FIGURE 1.

In FIGURE 2 there is illustrated the corresponding relationships in a downshift sequence carried out according to the prior practice, the same being reviewed here for convenient reference and for the purposes of a clear understanding of the present invention. Here the speed of the main shaft connected part again diminishes from the point when power is disconnected therefrom, the rate of such diminishing being determined in a given instance by the character and magnitude of the load on the vehicle in question. The engine connected part, however, accelerates often with a rapidity of several hundred r.p.m.'s per second of acceleration. Thus, the lines indicating deceleration of the main shaft connected part and acceleration of the engine connected part cross each other at a relatively high angle which means that the velocities of the interengageable parts are in the region of synchronization with respect to each other for only an extremely short period of time. Again, in the prior practice, the shift-initiating means react to the approach of synchronization and give a signal at approximately the point indicated by $S_2$ in FIGURE 2 and the shift is initiated in order that it will be completed slightly ahead of or at synchronization. However, where both the deceleration in the main shaft and acceleration of the engine is relatively high, it is often difficult, and occasionally impossible, to select the period of time by which the line $S_2$ is to precede the point of exact synchronization with sufficient accuracy to bring the parts into interengagement with each other at a point close enough to the exact point of synchronization and hence there is often a substantial clashing of the gears on a downshift and occasionally a complete failure to complete the shift at all.

Figure 3:
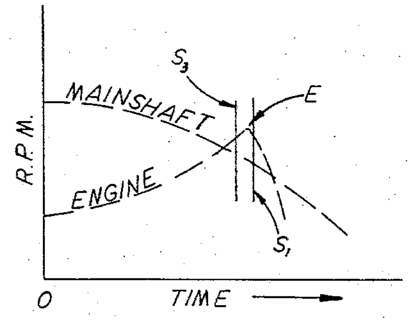
FIGURE 3 represents the volcity-time relationships of an engine connected shiftable element with respect to a ground connected shiftable element in a downshift operation carried out with an automotive-type transmission built according to the principles of the present invention.

FIGURE 3 illustrates the relative speeds of the parts in a corresponding downshifting sequence carried out according to the present invention. Here the speed of the engine connected parts and the speed of the main shaft connected parts are permitted to pass the point of synchronization so that the speed of the engine connected parts is greater than the speed of the main shaft connected parts. This brings the parts into the same speed relationships as in an upshift. This effects a signal the same as given for an upshift and applies engine-slowing means, such as a countershaft brake, which brings the speed of the engine connected part back toward the speed of the main shaft connected part. Thus, the shift is completed in the same manner as for an upshift and the likelihood of failure is virtually eliminated.

In carrying out this system it is necessary to make only a very minor modification in the speed-sensing means. The rest of the apparatus can remain the same as that used previously and reference is made to the above-mentioned patents and pending applications for more detailed disclosures of the several forms of apparatus by which this system may be utilized. However, for purposes of completeness in the present application, there is hereinafter set forth reference to the system substantially the same as that appearing in the above-mentioned application Serial No. 123,608 with only the modification necessary to adapt it to the present system.

Ratio shifting apparatus embodying, and chosen to illustrate, the invention consists of a change speed gear group T having a main transmission section M and an auxiliary transmission section A. In this partciular embodiment, said main and auxiliary sections are shown as serially positioned but it will be recognized that any arrangement providing for serial functioning thereof will be effective for the purposes of the invention. It will be clearly apparent that the placement of said gear groups in the same or separate casings will be immaterial to the accomplishment of the purposes of the invention.

While the specific transmission here utilized may take any of several forms, the transmission schematically shown in the drawings will sufficiently serve as an illustration of the invention and the following description thereof will therefore be taken as illustrative thereof but not as limiting.

TRANSMISSION STRUCTURE

For the purpose of convenience in reference, the terms "upwardly," "downwardly," "rightwardly" and "leftwardly" and derivatives thereof and words of similar import will be freely used to indicate directions taken with respect to the drawings. Such terminology will be used solely with respect to the drawings and will have no other significance.

An input shaft 1 drives input gear 2. The leftward end of a main shaft 3 of the main transmission M is supported by a bearing located within input gear 2. A plurality of gears 4, 5, 6 and 7 are supported on the main shaft 3, gears 4, 5 and 6 being each normally rotatable with respect to the main shaft 3 and gear 7 in this embodiment rotating with the main shaft. A sleeve 9 is splined to the main shaft 3 and is axially movable thereon to clutch gears 2 and 4 alternately to the main shaft . A gear 10 is splined to the main shaft and is axially movable thereon to clutch the gears 5 and 6 alternately to the main shaft. A countershaft 8 has a gear **2*a* secured thereto, which gear is constantly driven from the input gear 2. The countershaft has gears 4*a*, 5*a* and 6*a* secured thereto and in constant mesh with the gears 4, 5 and 6, respectively. Gear 7 is meshed with the countershaft gear 7*a* which is clutchable to the countershaft by the sleeve 7*b*. A reverse driver 10*a*, driven in a conventional manner from gear 10*b* on the countershaft, is axially slidable to engage the drive gear 10 for reverse operation. The gear 10, the splined sleeve 9, the driver 10*a* and the sleeve 7*b* are selectively moved by any convenient shift-effecting apparatus, such as shift forks 14, 13, 12 and 11, respectively, which are mounted on and movable with the shift rods 17, 16, 18 and 15**, respectively.

A clutch 19 is provided between the input shaft 1 and a power source shaft 21 in the usual manner. Said clutch is operated by the usual lever 22 from a cylinder 23.

The countershaft 8 has a countershaft brake 24 of conventional type connected thereto, said brake being actuated in an already well-known manner by a pressure fluid cylinder 26.

A plurality of pressure fluid cylinders is provided for actuating the shift rods 15, 16, 17 and 18. A cylinder 31 is provided for moving the shift rod 17 leftwardly and a cylinder 32 is provided for moving the rod 17 rightwardly. A cylinder 33 is provided for moving the shift rod 16 leftwardly and a cylinder 34 is provided for moving said shift rod 16 rightwardly. A cylinder 36 is provided for moving the shift rod 18 leftwardly and a cylinder 37 is provided for moving the shift rod 18 rightwardly. A cylinder 35 is provided to move shift rod 15 leftwardly, other means hereinafter described being provided to move rod 15 rightwardly.

A pair of neutralizing plates 38 and 39 have openings therethrough through which the shift rods 15, 16 and 17 pass. The shift rods 15, 16 and 17 have center stops 41, 42 and 43 rigidly affixed thereto, which stops are disposed between plates 38 and 39. A further stop 44, affixed rigidly with respect to the housing of the transmission, is provided for limiting the centerward movement of the neutralizing plates 38 and 39. A neutral cylinder 46 is affixed to the neutralizing plate 39 and a piston 47 disposed within said cylinder is affixed by suitable means, such as the rod 48, to the neutralizing plate 38.

Thus, movement of any of the shift rods 15, 16 and 17 in either direction will move one of said neutralizing plates away from the center stop 44. However, the area within cylinder 46 acted on by fluid pressure is greater than the corresponding areas in cylinders 31 to 35 so that energization of the neutral cylinder 46 will move both of said neutralizing plates toward the center stop 44 even though one of the shift rod cylinders 31–35 may be energized at the time.

Turning now to the auxiliary transmission A, which is here shown as of the range shifting type for illustrative purposes, the main shaft 3 is connected to an auxiliary input gear 51 which, in this embodiment, is in constant mesh with a gear 52 connected to the auxiliary countershaft 53. Countershaft 53 carries a further gear 54 which is in constant mesh with reduction gear 56. Gear 51 is mounted in suitable bearings, not shown, and gear 56 is mounted on the auxiliary main shaft 57, both of said gears being rotatable with respect to said auxiliary main shaft 57. An auxiliary slider 58 is splined on and is axially slidable along the auxiliary main shaft and is provided with jaw clutch means so that in its leftward position as appearing in the drawing the auxiliary input gear 51 will be clutched to the auxiliary main shaft 57 and in its rightward position the auxiliary reduction gear 56 will be clutched to the auxiliary main shaft 57. The slider 58 is moved along the shaft 57 by any conventional means such as a shift fork indicated schematically at 60. Synchronizer means 50 are placed between the teeth at the leftward end of the slider 58 and the auxiliary input gear 51 and further synchronizer means 55 are placed between the teeth at the rightward end of the slider and the auxiliary reduction gear 56. Each of said synchronizer means may be of any conventional form, either of the clutch-plate type or the cone type, but to minimize space requirements they are preferably of the clutch-plate type, such as that shown in United States Patent No. 2,627,955.

The shift fork 60 is connected by any convenient means **60*a* to the rod 59 and thence to a piston 61 within a cylinder 62**.

FIGURE 10 shows a crank mechanism 71 which operates in response to the neutralizing plates 38 and 39. Said crank 71 has a central shaft 72 with a valve crank 73 at one end thereof and a plate crank 74 at the other end thereof. The lower or free end of the plate crank 74 extends between the plates 38 and 39 and is snugly held therebetween when said plates are in their full centered position. The rod 72 extends through a slot 86 in a wall 87, said wall being a part of the frame of the transmission. The arrows 88 and 89 schematically indicate bearings acting against the ball 91 for holding said rod in an operable position as hereinafter further described. The plunger 82 of the supply relay valve 83 bears against the crank 73.

Thus, when both the neutralizing plates 38 and 39 are in their centered position, the crank 73 cannot rotate in either direction and supply relay valve 83 cannot respond to pressure in line 346 (FIGURE 4*a*) by moving into its rightward position. Thus, the valve is held in its leftward position as shown in the drawings. However, upon movement of the neutralizing plate 39 rightwardly, the rod 72 is permitted to pivot clockwise around a pivot provided between the lower end of the crank 74 and the neutralizing plate 38, such movement being permitted by the slot 86. This permits the valve 83, upon pressurizing of the line 346, to move rightwardly. Restoration of the plates 38 and 39 to their centered positions will return the crank 73 to the position shown in the drawings and return the valve 83 to its leftward position. Movement of the plate 38 leftwardly will permit the lower end of the crank 74 to move leftwardly and thus permit the rod 72 to rotate clockwise. This again permits the crank 73 to move clockwise and the valve 83 to move, in response to the pressurizing of line 346, into its rightward position. Again the restoration of the neutralizing plates 38 and 39 to their centered positions returns the crank arm 74 to its centered position as shown in the drawings and restores the valve 83 to its leftward position as shown in the drawings.

Now turning to the pressure fluid system, a description will first be made of the several valves and mechanism utilized therewith and this will be followed by description indicating the manner by which these parts cooperate with each other.

PRESSURE FLUID SYSTEM

(*a*) *Pressure fluid devices*

The brake relay valve 75 is of any conventional type by which the fluid pressure supply 315 is connected to the brake cylinder 24 upon the appearance of pressure at the port 397.

The clutch relay valve 76 includes a housing 77 having ports 78 and 79 and having an exhaust port 81. A plunger **76*a* is slidably disposed in the housing 77. Other conduits 363 and 365 are connected to the ends of housing 77 to supply pressure fluid thereto whereby said plunger 76*a* is urged rightwardly or leftwardly as developed further hereinafter. The plunger 76*a* is normally urged rightwardly by a spring 80**.

A supply relay valve 83 and an auxiliary relay valve 84 are also provided and are generally similar to the clutch relay valve excepting for details which will be brought out hereinafter.

The pulse valve 197 comprises a housing 198 having a rod 199 therein, said rod carrying pistons 201 and 202 of different sizes. Rod 199 is urged downwardly by the spring 203 and when it is in its downward position as shown, pressure fluid from conduit 344 entering through the lower end of the pulse valve 197 will pass by the piston 201 and out through the conduit 204. So long as there is no back pressure in the line 204, the spring 203 will hold the rod 199 in position as shown. However, as soon as a back pressure develops in the line 204, the pressure against the lower face of the piston 202 increases. This will push the rod 199 upwardly. In this position pressure fluid within the line 204 will exhaust through the exhaust port 206 but pressure from conduit 344 will now act against the lower face of the piston 201 to hold said valve in its upward position. Hence, the rod 199 will remain firmly in its upward position so long as there is pressure in conduit 344.

The four manually operable valves 232, 233, 234 and 235 appearing at the leftward side of FIGURE 4*a* are similar, manually operated, three-way valves of standard construction and need no detailed description other than that appearing in connection with the description of the general organization of the apparatus which follows hereinafter.

An inhibitor unit R is provided in mechanical association with the rod 59 of the auxiliary shifting unit and includes a housing 207 having a longitudinal opening 208 therein (FIGURE 4*a*). An inhibitor rod 209 having a reduced central portion 211 is slidably disposed within opening 208 and is mechanically connected to the rod 59. A pair of transverse chambers 212 and 213 (FIGURE 4*a*) are also provided in said housing offest sidewardly from but each being in communication with the longitudinal opening 208. A pair of inhibitor valve plungers 214 and 216 are received within said transverse chambers and each has a portion of reduced diameter intermediate its ends. The inhibitor rod 209 and the inhibitor plungers 214 and 216 have bevelled portions connecting their ends with their respective reduced diameter portions.

The transverse chamber 212 has ports 217 and 218 at its ends to which suitable conduits are connectible and it has further a port 219 at its side for communication with the port 217 when the valve plunger 214 is in its downward (FIGURE 4*a*) position. The transverse chamber 213 has ports 221 and 222 at its respective ends connectible to conduits and it too has a side port 223 which is in communication with the port 221 when the inhibitor plunger 216 is in its lower (FIGURE 4*a*) position.

The narrow central portion 211 of the rod 209 cooperates with the narrow central portions of the valve plungers 214 and 216 in such a manner that when the inhibitor rod 209 is in its leftward position as shown in FIGURE 4*a*, the valve plunger 216 is permitted to move upwardly upon a pressure appearing at the opening 222 therebelow but the valve plunger 214 is prevented from moving upwardly even upon the appearance of a pressure at the opening 218 therebelow. However, the ramps **211*a* and 211*b* are so related to the corresponding ramps on said valve plungers that, assuming that the valve plunger 216 is in its upward position, rightward movement of the piston 61 and consequently of the inhibitor rod 209 will pull the valve plunger 216 downwardly and the enlarged leftward end of the inhibitor rod 209 will prevent upward movement of the valve plunger 216 for so long as said inhibitor rod 209 is in its rightward position. However, such rightward movement of inhibitor rod 209 brings the narrow part 211 of said inhibitor rod in line with the valve plunger 214 and thereby permits it to move upwardly if and when a pressure appears at the port 218**.

Correspondingly, leftward movement of the inhibitor rod 209 acts through its ramp **211*a* to pull the valve plunger 214** downwardly into a position shown in FIGURE 4*a* and permits upward movement of the plunger 216 upon the appearance of a pressure at the port 222.

When the valve 214 is in its upward position it will close off the port 219 and when the plunger 216 is in its upward position it will close off the port 223.

Turning now to the selector valve S, this is generally similar to the mechanism previously utilized in the abovementioned patents and application and in addition is provided with additional means for controlling the auxiliary shifting unit. In the specific embodiment herein illustrated, the selector valve comprises a housing 241 (FIGURE 5) having an internal chamber 242 (FIGURE 6) which is closed by bottom plate 243. A rotor 244 (FIGURES 4*a* and 6) carries a ratchet 246 thereon, said rotor and said ratchet being rotatable together. Said rotor also carries a shaft 247 which is rotatably received within a wall 248 extending across the uper portion of said housing. A chamber 249 is defined at the upper part of said housing for receiving electrical switches, if desired, whereby the position of said rotor may be suitably indicated to the operator of the vehicle. The lower end of the rotor 244 is provided with an extension 250 rotatably received within an opening 251 within the plate 243.

The ratchet 246 is provided with teeth 301 thereon against which act pawls 302 and 303 (FIGURES 4*a* and 5) in response to actuation of fluid pressure cylinders 304 and 306. Suitable constantly acting means such as springs 307 and 308, normally hold said pawls in their leftward (as appearing in FIGURE 4*a*) position and further constantly acting means, such as springs 309 and 311, hold the pawls normally in position for engaging the teeth 301 but permit the pawls to ride over rearwardly adjacent teeth on their retracting stroke following a given actuation thereof.

Said rotor 244 has a pair of large extensions 252 and 253 (FIGURE 8) and a pair of small extensions 254 and 256. The pair of large extensions have openings 257 and 258, respectively, therein which are adapted to communicate with a plurality of openings **259*a* (FIGURES 6 and 9), 259*b*, 259*c*, 259*d*, 382, 384 and 359 in the bottom plate 243. Similar openings 261 and 262 are provided within the arms 254 and 256, respectively. The openings 261 and 262 are arranged for communication with further openings 263*a*, 263*b*, 263*c*, 263*d* and 392 within the bottom plate 243**.

A central passageway 264 communicates with the opening 251 and is divided into branches communicating with the openings 257 and 258. Opening 251 is connectible to a source of pressure fluid. A further passageway 266 communicates as convenient through opening 265 with another supply of pressure fluid and also communicates with a chamber 267 surrounding the shaft 247 between suitable fluid seals 268 and 269. The shaft has a radial opening 271 extending between chamber 267 and a central passageway 272 in the shaft 247 . The passageway 272 has branches **272*a* in the arms 254 and 256 communicating with the openings 261 and 262** (FIGURE 8).

A rocker 273 is provided with oppositely positioned, coaxial, stub shafts, the upper one 274 of which is pivotally received in the housing 241 and the lower one 276 of which is pivotally received in the bottom plate 243. The rocker 273 has a first central passage 277 supplied through passageway 270 (FIGURES 4*a* and 6) which communicates with an opening **277*a*** (FIGURES 4*a* and 8) in the lower side of said rocker 273. Opening **277*a* is alternately registerable with ports 401 and 402 (FIGURE 9) in bottom plate 243. An opening 279 through the bottom plate 243 communicates with a second central passage 281 in said rocker and thence communicates with a further opening 280 in the bottom of said rocker at the other end thereof with respect to the opening 277*a*. Opening 280 is alternately registerable with parts 374 and 376 in plate 243**.

Said rocker 273 has legs 283 and 284 extending therefrom at points spaced from the central pivot point about which said rocker operates for purposes appearing hereinafter. The rotor 244 has a notch 286 provided therein which in this instance constitutes a chordal sector of said rotor. The relationship of said rocker 273 and the legs 283 and 284 thereof with said rotor 244 and the notch 286 thereof is illustrated in FIGURES 4*a*, 4*b*, 4*c*, 4*d* and 8, wherein it is shown that:

(1) Commencing (FIGURE 4*a*) with the notch 286 in a position substantially parallel with the arms 283 and 284, the portion of the rotor 244 adjacent the arm 284 will clear said arm whereby said rotor can rotate counterclockwise as appearing in FIGURE 4*a* and will not interfere therewith until the end 291 of notch 286 engages leg 283.

(2) Upon counterclockwise rotation thereof, the portion of said rotor adjacent to the arm 283 will first come to a position adjacent to said arm as shown in FIGURE 4*d* and upon continued counterclockwise rotation will effect a rocking of the rocker 273. This will move the arm 283 out of the way of said rotor and enable the rotor to continue counterclockwise rotation with the corner 291 of the notch 286 now clearing the adjacent corner of the arm 283.

(3) This, however, moves the arm 284 into its inward position whereby upon clockwise rotation of said rotor it will be struck by the corner 292 of the notch 286 and effect an opposite rocking of said rocker.

As said rotor rotates, it does so with respect to the bottom plate 243 and the openings 257 and 258 therein come successively into register with one of the openings **259*a*–259*d*, 359, 382 and 384 therein and the openings 261 and 262 come successively into register with the openings 392 and 263*a*–263*d*** therein.

Referring again to FIGURES 4*a* to 4*d*, inclusive, the circle described by the openings 257 and 258 is indicated by the circle I therein with the openings 257 and 258 being disposed inside of said circle and the corresponding openings **259*a*–259*d*, 382, 384 and 359 being disposed outside of said circle. The circle described by the openings 261 and 262 is shown at II with the broken line III indicating mechanical connection between said circles. The openings 261 and 262 are indicated schematically on the inside of said circle II and the openings 263*a*–263*d*, inclusive, and 392** are indicated schematically on the outer side of said circle.

(*b*) *Pressure fluid connections*

Turning now to the pressure fluid connections for said mechanism, a source 315 of pressure fluid is provided in any convenient manner and may include a reservoir of compressed air supplied and held under pressure by any convenient means, not shown. Said supply is connected by a line 331 to the inlets of the manually operable valves 232, 233, 234 and 235. Each of said valves is spring biased to normally close their respective inlets. The outlets of each of said valves are normally connected to the exhaust openings thereof but are connectible to the inlets thereof by depression of the manually operable buttons. The outlet of the start valve 232 is connected by a conduit 358 to the rightward end of the neutral relay 317. The outlet of upshift preselect valve 233 is connected by a conduit 338 to the upper end of the shuttle valve 341. Such shuttle valve is comprised of a housing surrounding a ball 342, which ball moves from the upper to the lower end of the housing, and thereby closes one or the other of the lines connected thereto. The outlet of upshift preselect valve is also connected to cylinder 304.

The line 340 from the outlet of the downshift preselect valve 234 connects to the lower end of the shuttle valve 341 and connects further through a line 343 to the leftward end of the other cylinder 306. The outlet line 344 of the shift valve 235 connects to the lower end of the pulse valve 197. The outlet 204 of said pulse valve 197 connects to the leftward end of the neutral relay 317. The middle connection of the shuttle valve 341 connects through a line 346 to the leftward end of the supply relay 83.

Returning now to the supply 315, it is further connected by a line 347 to one connection of the valve 83 and is further connected through lines 348 and 350 to a port 367 of auxiliary relay 84. Line 348 is also connected by line 391 to passage 266 so that pressure fluid is continously supplied to openings 261 and 262. Line 348 is connected by lines 350 and 270 to passage 277 so that pressure fluid is continuously supplied to opening **277*a*. A line 355 connects the supply 315 to the supply connection of the brake relay 75**.

Returning to the supply relay 83, its other principal port is connected by a line 351 to the line 327 and is also connected by a further line 352 to the supply lines 353 and 354 of the rocker 273 and detector valve 123, respectively. Line 327 is connected to the rightward end of clutch relay valve 76 and is connected to the passage 264.

One port of the neutral relay 317 is connected by a conduit 356 to the neutral cylinder 46. Another port of neutral relay 317 is connected by another conduit 357 to the supply conduit 348. Still another port of relay 317 is connected by line 358 to the outlet of start valve 232. The extreme rightward end of neutral relay 317 is connected by a conduit 360 to the neutral opening 359 in the outer ring of valve ports of the selector unit S. A further and intermediate port of the neutral relay 317 is connected by conduit 361 to a port 362 of the detector valve 123.

The clutch relay 76 has its rightward end connected by a conduit 365 to the conduit 327. The other end of said clutch relay is connected by a conduit 363 to another outlet port 364 of the detector valve 123. Port 79 of the clutch relay 76 is connected by a conduit 366 to the clutch cylinder 23.

Turning now to the auxiliary relay 84, the supply line 348 is connected to the port 367 thereof and an adjacent port 368 is connected by a line 369 to the rightward end of the auxiliary actuating cylinder 62. A further outlet port 371 is connected by a line 372 to the leftward end of the auxiliary cylinder 62. The lower end of the auxiliary relay 84 is connected by a line 373 to the leftward port 374 associated with the opening 280 of said rocker 273. The upper end of auxiliary relay 84 is connected by a conduit 375 to the rightward port 376 associated with opening 280 of said rocker.

The ports **259*a*–259*d*, inclusive, in the outer circle I of the rotor 244 are connected by conduits 377, 378, 379 and 381, respectively, to the shift cylinders 33, 34, 31 and 32, respectively. The ninth speed port 382 of rotor 244 is connected by a conduit 383 to the ninth speed shift cylinder 35. A reverse port 384 of the rotor 244 is connected by a conduit 386 to the reverse cylinder 36. A conduit 387 provides a constant pressure fluid supply from the line 355 to the cylinder 37 for providing a constant return pressure for reverse shift rod 18**.

The inner circle II of ports associated with the selector valve S has a conduit 266 connecting the ports 261 and 262. The conduit 266 is connected by the line 391 to the supply line 348, whereby to provide a constant supply of fluid pressure to said ports 261 and 262. The outlet ports registerable therewith, namely, the ports **263*a*–263*d*, inclusive, are respectively connected by suitable conduits to the detector shift rod cylinders 107, 106, 109 and 108, respectively. A port 392 is connected by a conduit 393 to the detector shift rod cylinder 104**.

Referring to the detector signalling cylinder 123, a line 394 connects port 364 thereof to the actuating port 397 of the brake relay valve 75. A port 399 at the leftward end of said valve 123 is connected by a conduit 400 to a port 223 of the inhibitor valve R. A port 398 at the rightward end of said valve 123 is connected by the conduits 354, 352 and 351 to the supply relay 83.

The upper port **277*a* of rocker 273 registers alternately with ports 401 and 402 which are respectively connected by conduits 403 and 404 to the ports 222 and 218** of the inhibitor valve R.

In the inhibitor valve R, the upper end of the chamber 212 thereof is connected by a conduit 405 to the neutral cylinder 46. The upper end of the corresponding chamber 213 is connected by a conduit 406 to the port 219 of said chamber 212.

The core 122 of the valve 123 has a central passage 407 therein. The passage 407 has a transverse portion **407*a* which can be placed in communication with either the port 364 or port 362** as desired.

(*c*) *The signalling device*

Referring now to the signalling device U which is provided for detecting the relative speeds of the toothed elements about to be engaged and for giving a signal when said speeds are in predetermined relationship to each other, this is the only part of the previously provided mechanism which requires modification to enable said mechanism to incorporate and follow the system of the present invention.

It will, of course, be recognized that the signalling unit may be as shown in any of the above-named patents or patent applications and that any thereof may be modified according to the principles hereinafter set forth. However, for the purpose of convenient references, the signalling unit shown here for illustrative purposes is substantially the same as that shown in Patent No. 2,943,719, as well as in the above-mentioned Serial No. 123,608 and will be briefly described as follows.

Whereas in previous constructions said signalling device was arranged for giving a signal prior to the attainment of synchronization in the parts being interengaged regardless of the direction from which synchronization is approached, in the present apparatus only a signal corresponding to the former upshift signal is given in a manner described above and set forth in connection with FIGURES 1 and 3.

In general, and still with reference to FIGURE 4*a*, said signalling unit U includes a first shaft 92 having a plurality of ratio gears 93, 94, 95, 96 and 97 supported thereon and arranged for rotation with respect thereto. A yoke 98 is provided in association with a shift rod 99 for connecting the gear 93 to the first shaft 92 in response to axial motion of said shift rod 99. A yoke 100 is arranged in association with a shift rod 101 for connecting the gears 94 and 95 alternately to the first shaft 92 upon axial movement in one direction or the other of the shift rod 101. A third yoke 102 is arranged in association with a third shift rod 103 and is provided for connecting one of the gears 96 and 97 to the first shaft 92 upon movement of the third shift rod 103 axially in one direction or the other. A suitable signalling cylinder 104 is provided for axial actuation of the first shift rod 99. Similar signalling cylinders 106 and 107 are provided for axial actuation of the second shift rod 101 and other cylinders 108 and 109 are provided for axial actuation of the third shift rod 103. Connecting means indicated generally at Y—Y are provided for connecting one end, here the main transmission main shaft 3, of the transmission T with the first signalling shaft 92.

A second signalling shaft 112 is rotatably supported parallel with the first signalling shaft 92 and is provided with gears 113, 114, 115, 116 and 117, which are fixed thereon, each of said gears being respectively in constant mesh with the gears 93 to 97. A splined drive member 118 is also fixed to said second shaft 112 and supports a slidable sleeve 119 in axially movable, nonrotative, relationship therewith. Said sleeve is rendered axially movable by the yoke 121 which is connected to a rod 122 which is actuated by the signal valve structure 123 as hereinabove described in more detail.

The other end, here the input shaft 1 (FIGURE 4*a*) of the transmission T, is connected by connecting means, schematically indicated at X—X, to a shaft 126 which is rotatable with respect to the housing of the signalling unit U, and is here shown as mounted coaxial with the first signalling shaft 92. A gear 127 is secured upon, and rotatable with, the shaft 126. A gear 131 which is in constant mesh with the gear 127 is arranged rotatably on, and with respect to, the shaft 112. Speed sensitive means 133 is provided for cooperation with the sliding sleeve 119 for connecting the gear 131 as desired to the shaft 112. A spacer 185, if desired, fills the space between the gear 131 and the adjacent end of the surrounding housing.

Referring now to FIGURE 11, for more details of said speed sensitive unit 133, there is provided a pair of serially arranged blocker members 167 and 174 cooperating with the gear 131. Said structure 133 is arranged for limiting at one of two predetermined points axially rightward movement of the sleeve 119 in response to pressure applied to the valve core 122 (FIGURE 4*a*) through line 400 and permitting such axial movement beyond said points only when a certain speed relationship has been established between the shaft 112 and the shaft 92, and consequently between the input and output shafts of the main transmission.

A recess 163 is provided in the rightward end (FIGURE 11) of the splined member 118 and slots 164 and 166 (FIGURE 12) are provided extending diametrically across said rightward end of said member 118 to the same depth as the recess 163.

An upshift blocker 167 (FIGURES 11, 14 and 15) is provided with teeth 168 having the same shape and spacing as the splines on the member 118. Said blocker 167 has a tapered opening 169, the wall of which rides upon, and is frictionally engaged by, a similarly tapered surface 171 on the hub 183 (FIGURE 11) of the gear 131. Tongues 172 and 173 (FIGURES 11 and 12) extend from the body of the blocker 167 into the respective parts 166*a* and 166*b* of the slot 166. However, it will be noted that said tongues are narrower than said slot by a distance approximately equal to one-half the width of one tooth.

A downshift blocker 174 is arranged between the upshift blocker 167 and the splined member 118 and has slots 175 and 176 (FIGURE 13), through which the tongues 172 and 173 can extend. Said blocker 174 is provided with teeth 177 similar in size and shape to the splines on the member 118 and it is provided with a tapered opening 178, the wall of which rides upon, and is frictionally engaged by, the above-mentioned similarly tapered surface 171 on the hub 183 of the gear 131. Extending leftwardly from the body of the blocker member 174 are suitable lugs 181 and 182 (FIGURE 12) which are received into the parts 164*a* and 164*b*, respectively, of the slot 164. The lugs 181 and 182 are each narrower than the respective slots into which they are received by a distance approximately equal to one-half the width of a spline on the splined member 118.

Resilient means, such as the leaf spring 160 is disposed between the axial end wall of the cavity 163 in the splined member 118 and the adjacent ends of the tongues 172 and 173, and the lugs 181 and 182. Thus, since the splined member 118 and hub 183 are held against appreciable movement away from each other, the spring 160 urges the blocker members 167 and 174 into frictional engagement with the tapered surface 171.

OPERATION

(*a*) *Operation of mechanical parts*

Turning now to the pressure fluid responsive mechanism and the mechanical operations by which a shifting operation takes place, attention is again called to the fact that the particular shifting apparatus here utilized to illustrate the invention is substantially similar to that illustrated and described in application Serial No. 39,064, assigned to the same assignee as the present invention. However, the apparatus herein described embodies improvements over that appearing in said previous application. Accordingly, it will be described herein briefly for the purpose of a ready understanding of the present invention.

Assuming first that the vehicle is at a standstill with the engine idling, a pressure will be created at the pressure supply 315 and will pressurize the line 331. However, since each of the valves 232, 233, 234 and 235 is closed, the pressure fluid will stop at these respective valves. Pressure will, however, supply the lines 347, 348, 350 and 355 and other lines directly connected thereto. The clutch may be placed in a disengaged position by depression of the foot pedal by the operator. Since the valve 75 will be held in its closed position, pressure in line 355 will stop at this valve. With valve 83 positioned as shown, pressure will pass through relay valve 83 to line 351 and thence to line 327 and through selector S and its neutral port 359 to line 360. This holds the core of neutral relay 317 in its leftward position. Pressure in line 357 will stop at valve 317. Pressure in line 327 will hold the plunger of valve 76 in its leftward position. Thus, cylinder 23 is connected to the exhaust. Simultaneously pressure from the line 348 will, in the position of the parts shown in FIGURE 4*a*, pass through the valve 84 and thence by the passageway 369 to the rightward end of the auxiliary cylinder 62. This continues holding the auxiliary transmission parts in the direct drive position shown in the drawings wherein the gear 51 is clutched to the auxiliary main shaft 57. Also, pressure flows from the line 348 by the lines 350 and 270 to the port 277 for supplying a constant pressure through the port 277*a* to one of the conduits 403 and 404. In the position of the parts shown in FIGURE 4*a*, the pressure is in this manner supplied to the conduit 404 and, thus, to the port 218 of the inhibitor R. However, since the restrictor rod 209 is already in the leftward position, the plunger 214 is unable to respond to the pressure at port 218. Pressure in line 351 passes through line 352 to the port 281 in the rocker member 273 and thence to the port 374 and thence by the conduit 373 to the lower end of the auxiliary relay 349 by which the core of said relay is held in the upward position as shown. A further supply is also connected by the lines 348 and 391 to the passage 266 of the selector valve S whereby to supply fluid pressure to both of the ports 261 and 262 thereof. However, in the neutral position of the apparatus, neither of the ports 261 nor 262 is connected to other ports in the inner circle II of said valve and thus none of the shift cylinders in the detector portion of the apparatus is energized.

(*b*) *Shift from neutral to first gear* (*vehicle at standstill*)

The selector S is first placed in its first gear position by repeated depression of the downshift valve 234 and consequent counterclockwise rotation of the selector S until the port 257 communicates with the line 381 as the same appears in FIGURE 4*b*. Thus, each depression of the downshift valve 234 energizes the line 343 which energizes the cylinder 306 and moves the pawl 303 rightwardly to effect a counterclockwise rotation of the rotor 244 one increment. Release of the downshift valve permits the cylinder 306 to exhaust through the exhaust port of said valve and resets same for a subsequent actuation. As the point 291 approaches the leg 283 of the rocker 273 (the position shown in FIGURE 4*d*) it will upon the next actuation of rotor 244 shift said rocker into the position appearing in FIGURE 4*b* and thereby shift the port 277*a* into connection with the line 403 and shift the port 280 into connection with the line 375.

This connection of the port 277*a* with the line 403 applies pressure to the port 222 and moves the plunger 216 upwardly while relieving pressure from the port 218. With the supply relay valve 83 still in its neutral position, pressure is applied through the lines 351 and 352 to the port 281 and thence by the port 280 to the upper end of the auxiliary relay 84 for moving same into its lower position. This connects the lines 348 and 350 to the line 372 and thus pressurizes the leftward side of the auxiliary shift cylinder 62 and relieves pressure from the rightward side of said cylinder.

Therefore, pressure urging a rightward, that is a reduction, shift of the auxiliary transmission is applied thereto and the shift is effected either immediately or as soon as conditions within the auxiliary transmission make such shift mechanically possible.

It should be stated here that if the selector valve S was not previously left in neutral position, the initial movement of either the upshift or the downshift valves 233 or 234 would act through the valve 341 to pressurize the line 346 and thus move said valve 83 rightwardly. This will connect line 351, and the other lines connected thereto, to exhaust. In this case, when the first gear position is attained by rotor 244, the shift valve 235 would be depressed to shift valve 317 to the right to thereby return the shift rods to neutral and move the valve 83 to its leftward position.

When the first gear position is attained by the rotor 244, and the port 257 is connected to the line 259*d* , pressure is applied through said port and line 381 to the shift cylinder 32 urging the rod 17 rightwardly. However, pressure is still on the neutral cylinder 46 and this pressure overcomes that in the shift cylinder 32, due to the larger diameters of the neutral cylinder 46 as compared to the several shift cylinders, and the rod 17 does not move.

Continuing to consider the apparatus for illustrative purposes as installed in a vehicle, such as a highway truck or an earth moving machine, the apparatus is now to be started from its standstill position and a shift from neutral into first gear is to be effected.

The operator first depresses the start valve 232 to introduce pressure into the line 358. This pressure is introduced into the rightward end of a neutral relay 317 and moves same leftwardly, or holds it leftwardly if, because of its previous condition of operation, it is already in its leftward position as shown in the drawings. This closes the line 357 and exhausts the lines 78, 79 and 356 together with the clutch cylinder 23 and the neutral cylinder 46. This also exhausts the chamber 212 of the inhibitor valve which is connected to the line 356 and hence exhausts line 400 and the leftward end of cylinder 123, thereby permitting piston 122 to return to its leftward position ready for the next shift.

Inasmuch as the operator will continue to hold the clutch open by the foot pedal, exhausting of the clutch cylinder 23 will have no effect on the apparatus. However, the exhausting of the neutral cylinder 46, inasmuch as pressure is already on the first gear shift cylinder 32, as above described, will permit rightward movement of the shift rod 17 and the gear 10 associated therewith for engaging the first speed gear 6 with the main shaft 3 of the transmission. Thus, the shift into first gear in the main transmission is made, or will be completed if the clutch teeth interfere with each other, as soon as the clutch is engaged by the operator to commence rotation of the gear members. Likewise, with shifting pressure already on the leftward end of the auxiliary shift cylinder 62 commencement of the rotation of parts will permit shifting of the auxiliary to be completed, if it has not already been effected, and the vehicle is in first gear position.

(*c*) *Shift from first to second speeds*

With the vehicle now operating in first gear position, and it being desired to shift same into its second gear position, the upshift valve 233 is depressed once to shift the rotor 244 clockwise one increment. Depression of the valve 233 energizes the line 338 which energizes the line 339 and thereby energizes the cylinder 304 to move the pawl 302 rightwardly. This effects one increment of rotation of the selector valve S in a clockwise direction to place the port 257 thereof in communication with the conduit 379. Simultaneously the pressurizing of line 338 moves the ball 342 downwardly and establishes communication between the line 339 and the line 346. This pressurizes the supply relay valve 83 and moves the core thereof rightwardly. Simultaneously a constant fluid pressure supply from line 348 passes through line 391 to the circle II and thence through passageway 266 to the port 261, thence through the port **263*c* to the second speed cylinder 109 of the detector unit. This will effect a shifting of the rod 103 rightwardly and a connection of the shaft 92 with the shaft 112** in relationship corresponding to the speeds of the second gear ratio in the main transmission.

Movement of the valve 83 rightwardly exhausts the line 351 which accomplishes several things, namely:

(a) Depressurizes the line 365 and the spring 80 effects a movement of the valve 76 into its rightward position, (b) Exhausts the line 264 in the rotor, (c) Acts through the line 352 to exhaust pressure on the port 281, (d) Also depressurizes the line 354 and thereby the rightward end of the detector valve 123.

When the operator is ready to effect the shift, he depresses the shift valve 235. This pressurizes the line 344 and, in a manner explained in more detail in application Serial No. 39,064, this first pressurizes line 205 and moves the core of the neutral relay valve 317 rightwardly. As pressure builds up in line 205, this acts against the piston 202 to move same against the urging of spring 203 into its full upward position where pressure from line 344 holds the core of valve 197 while pressure from line 205 exhausts through exhaust 206. When the operator releases the shift valve 235, the line 344 exhausts and the valve 197 returns to its normal position.

The rightward shifting of the valve 317 introduces pressure fluid from the line 357 into both the lines 78 and 356. In view of the rightward position of the valve 76, pressure from line 78 passes through the valve 76 and pressurizes the line 366 and thereby the clutch cylinder 23. This disengages the clutch 19. Simultaneously pressure from line 357 pressurizes line 356 to energize the neutral cylinder 46 for returning the main gear parts to their neutral position. Pressure in line 356 is also conducted by line 405 to the upper end of the chamber 212 in the inhibitor valve R and thence to the passageway 406, chamber 213 and passageway 400 to the leftward end of the valve 123 in detector D (the valve 216 being held open by the rod 209 being in its rightward position and the valve 214 being permitted to open by the line 404 being open to the atmosphere). This urges the piston thereof 122 rightwardly until the internal splines of sleeve 119 engage the blocker teeth of the blocker structure 133.

This being an upshift, it will be recognized that the engine speed as appearing on shaft 1 will be considerably greater at the commencement of the shifting operation than it will be when said shifting operation is completed. In other words, assuming the output shaft 57 remains at constant or substantially constant speed, and since no shift will take place in the auxiliary transmission, the speed of the main shaft 3 of the main transmission will remain substantially constant and the speed of the input shaft 1 will be substantially reduced. Since the speed of shaft 1 will be reflected through the connection X to the shaft 126, and since the leftward movement of the detector shift rod 103 has already effected a ratio change in the detector so that the rate of rotation of the sleeve 119 is substantially slower than it would be under conditions of first gear connection, (the parts appearing as shown in FIGURE 14), the sleeve 119 will pass the blocker 174 but will be blocked by the upshift blocker 167 of the speed comparator unit 133. In this position, passageway **407*a* is aligned with port 364**.

Release of the clutch 19 releases the transmission torque allowing the pressure already in cylinder 46 to return shift rod 17 leftwardly to neutral. When the shift rods of the main transmission reach neutral, valve 83 is moved to its leftward position with the following results:

(a) Pressure is applied to line 351, thence through line 327, passage 264, opening 257 and line 379 to cylinder 31 to urge shift rod 17 leftwardly. However, since pressure is still present in cylinder 46, no movement of the rod 17 occurs.

(b) Pressure is applied through line 365 to the rightward end of valve 76. Simultaneously pressure in neutral cylinder 46 travels through the line 405, through the valve chambers 212 and 213 to and through the line 400 to move the piston 122 rightwardly as far as possible until it is stopped by the blocking mechanism 133. Since the passageway **407*a* is aligned with the port 364, pressure from the line 351 travels through the lines 352 and 354 to the rightward end of the passageway 407 thence through the port 364 to and through the conduit 363 to the leftward end of the valve 76 to balance the pressure applied thereto from the passageway 365. Thus, in all positions excepting those range shifts where the action of the inhibitor R occurs as described hereinafter, the core 82 of the valve 76 will remain in its rightward position and the clutch will remain disengaged. If the pressure is a little slow in moving through the several passageways required to enable it to reach the lefthand side of the valve 76, the spring 80 will tend to hold the valve 82 rightwardly until the pressure in line 363 has time to build up. At most, even if the pressure in line 363 still lags sufficiently to permit the valve 82 to move leftward, it will be only momentary so that the clutch cylinder 23** will be de-energized only momentarily and the clutch thereby engaged for only an instant. If this happens, no harm will be done since the clutch will be immediately again disengaged when pressure in line 363 supplemented by the spring 80, returns the valve 82 rightwardly.

(c) Pressure is applied through line 352 to lines 353 and 354. Pressure in line 353 passes through openings 281 and 280 to line 375 to hold the core of valve 84 in its lower position. Pressure in line 354 passes through passageway 407 and through the port 364 to the line 394 from which it goes to the relay valve 75 for actuating same and thereby energizing the countershaft brake cylinder 26. This applies the countershaft brake 24 and the countershaft, being connected through the gear 2 to the shaft 1, rapidly diminishes the speed of these parts toward the speed necessary to complete the shift into second speed gear. As the speed of shaft 1 diminishes, a corresponding diminishing speed is applied through the connection X and the gear 131 to the blocker 167. At a suitable trigger speed ahead of the actual synchronization of the main transmission gears, the main shaft driven shaft 112 will rotate the slide 119 in synchronism with the engine driven gear 131, the blocker 167 will release and the sleeve 119 will move into its full rightward position.

Such movement of the sleeve 119 connects the core passageway 407 of the valve 123 to the port 362 thereof. This pressurizes the line 361 which pressurizes the rightward end of the valve 317 and moves the core thereof to its leftward position. This connects both the line 78 and the line 356 to the exhaust through the valve 317. Exhausting line 356 and thereby the neutral cylinder 46 permits the pressure already present in the second gear shift cylinder 31 to move the rod 17 leftwardly, and thereby move the gear 10 into engagement with the gear 5 whereby to put the main transmission into its second gear position. Simultaneously the exhausting of the line 366 permits the clutch cylinder 23 to become exhausted and permits the clutch to re-engage.

If desired, a restrictor may be placed in the line 366 to insure re-engagement of the clutch 19 only after completion of the shift into second gear position, but this is normally unnecessary.

Exhausting of the neutral cylinder 46 also effects exhausting of the line 405 and parts connected therewith. The shift into second gear is now completed.

(*d*) *Shift from second to third and third to fourth speeds*

These shifts are substantially the same as the shift from first to second and need no special description.

(*e*) *Shift from fourth to fifth speeds* (*including range shift*)

It is in this shift from fourth to fifth that the range shifting of the auxiliary takes place. Accordingly, this is the operation in which the inhibitor structure R is caused to function and in which the predictor system described above is combined with the range shifting concept also referred to above.

Commencing a shift from fourth to fifth, the rotor 244 is in the position shown in FIGURE 4*c* wherein the port 257 is in communication with the conduit 377, and the point 292 is adjacent the leg 284 of the rocker 273. With the next movement of the rotor in clockwise direction, in response to actuation of valve 233, the same assumes the position as shown in FIGURE 4*d* wherein the port 258 is now in communication with the conduit 381, opening **277*a* is in communication with line 404 and opening 280 is in communication with line 373**.

While the connection of the port 258 to the line 381 will prepare the system for shifting in the manner above described in connection with the shifting into first gear, it will not go further and effect an actual shift until further signal by the actuation of the shift valve 235. However, movement of the rocker 273 into the position shown in FIGURE 4*d* will immediately connect the port 280 to the line 373 and thereby move the core of the auxiliary relay valve 84 upwardly as soon as the line 352 is energized.

Actuation of the upshift valve 233, in the manner above described, will not only pressurize the cylinder 304 for effecting an upshift or clockwise movement of the rotor 244 and shifting of rocker 273, but will also pressurize the line 346 and move the core of valve 83 rightwardly in the same manner and with the same results as discussed in connection with the first-to-second gear shift. This effects exhausting of the lines 351, 327 and 352. Pressure from line 348 is applied through line 391 to the passageway 266, thence through port 262 to the connection **263*d* which connects to the shift cylinder 108. This urges the rod 103** leftwardly.

The only significant difference at this point from the operation performed in the shift from first gear to second gear is that the rocker 273 connects the constant pressure fluid supply in line 270 through the opening **277*a* to line 404 to the port 218 in housing 207. This urges the plunger 214 thereof upwardly. When the transmission is in fourth gear, the sleeve 58 is meshed with gear 56 and piston 61 and rod 59 are at the rightward end of their travel. Thus, the plunger 214 is free to move upwardly and does so, blocking port 219. This blocks pressure fluid from the line 405 from entering the line 400 and at the leftward end of the valve 123 until after shifting of the auxiliary cylinder 62 is completed. Said shifting is initiated as above mentioned upon the appearance of pressure in the rightward end of the auxiliary shift cylinder 62**.

With the system thus made ready for the shift, the shift valve 235 is depressed at the will of the operator when he is ready to effect the shift from fourth to fifth position. This energizes the line 344 and the pressure fluid appearing therein passes through the pulse valve 197 and thence by the line 205 to the neutral relay valve 317 to move said valve rightwardly. As soon as pressure builds up in the line 205, it moves the pulse valve 197 upwardly as above described for exhausting the line 205. When the shift valve 235 is released by the operator, it returns to the position shown in the drawing and the line 344 is exhausted.

Rightward movement of the neutral relay valve 317 energizes the line 78 and thence, because of the rightward position of the clutch relay valve 76, so held by the spring 80, the line 366 is energized and the clutch cylinder 23 activated to open the clutch 19. Simultaneously, the pressure fluid in line 357 energizes line 356 which actuates the neutral cylinder 46 to move the main transmission into its neutral position. Pressure fluid in the line 356 also passes through the line 405 to the port 217. However, it is blocked at that port by the upward position of the plunger 214 which is so held by the constant pressure from the line 404 supplied through the rocker 273 from the line 270. As soon as the main transmission comes into neutral, and the supply relay valve 83 is thereby moved leftwardly, the supply in line 347 is connected to the line 351 and pressurizes the following:

(a) Line 327 which goes through line 264 and port 258 to line 381 and thence pressurizes the shift cylinder 32.

(b) From line 327 to line 365 which moves the clutch relay 76 leftwardly, exhausting said clutch and permitting it to re-engage, pressure in line 363 being this time blocked by the leftward position of valve core 122 (in valve 123) which has not yet been moved rightwardly due to the blocking of the pressure in line 405 by the inhibitor R.

(c) Line 352 which energizes port 280 of the rocker 273 thereby moving the auxiliary relay valve 84 upwardly which connects the constant pressure appearing at port 367 to the line 369 which imposes pressure on the rightward end of the auxiliary shift cylinder 62.

(d) Line 352 also energizes line 354 which supplies the rightward end of the detector valve 123 and thereby passage **407*a***.

Pressure at the rightward end of the auxiliary shift cylinder 62 urges the sleeve 58 leftwardly and, since the main transmission is now in neutral, the pressure on the reduction clutch between the sleeve 58 and the gear 56 will be released so that said sleeve 58 can shift out of reduction connection and toward direct connection. This will engage the synchronizer 50 and as soon as the parts are brought into synchronous condition, the leftward movement into direct position will be completed. As the rod 59 continues its leftward movement, the bevelled surface 211*a* will act against the corresponding surface on the plunger 214 and pull it downwardly. This will connect the port 217 with the port 219 and thus permit pressure from the line 205 to travel into the line 406 to the chamber 213. There being no pressure at the port 222, the pressure appearing above the plunger 216 will hold it downwardly and thereby connect the port 221 with the port 223. This pressurizes the line 400 and thereby pressurizes the leftward end of the detector valve 123. This moves the core of said valve rightwardly and thereby effects engagement of the sleeve 119 against the blocker member 167. As set forth in more detail in Patent No. 2,943,719, this connects the passage 407*a* with the port 364 and thereby pressurizes the line 394. This pressurizes the brake relay 75 which energizes the brake cylinder 26 and applies the countershaft brake. Simultaneously it pressurizes through line 363 the leftward end of the clutch relay 76 and again moves the core thereof into its rightward position for energizing cylinder 23 and thereby opening the clutch 19. Application of the countershaft brake rapidly slows the shaft 1 to a point where synchronization is substantially approached and the relative speeds of the gears will be reflected through the connections X and Y in the shafts 126 and 92, respectively, of the detector unit. This, as described in detail in Patent No. 2,943,719, will unblock the blocker 167 at a point shortly before actual synchronization of the fifth speed gears in the main transmission, namely, the gear 6 and the countershaft gear connected therewith, and permit further rightward movement of the sleeve 119 and of the core 122 of the detector valve 123. This connects the rightward end of the detector valve 123 with the port 362 and thereby pressurizes the line 361 associated therewith. This pressurizes the rightward end of the neutral relay valve 317 moving same leftwardly which cuts off the supply line 357 for both the clutch and the neutral cylinder 46. The clutch is thereby permitted again to re-engage and the neutral cylinder is exhausted through the exhaust port of the neutral relay 317 which latter also exhausts the clutch cylinder 23. The neutral cylinder being exhausted, the pressure in cylinder 32 now effects rightward movement of the rod 17 and the shift into fifth position is completed.

It will be further observed in the foregoing description that while the main transmission is in neutral position, it is maintained the same as in the sequence set forth in Patent No. 2,637,221, but that the completion of the shift in the main transmission and in fact the application of the countershaft brake to cause synchronization in the main transmission is delayed by the inhibitor structure R until after the shift of the auxiliary unit is completed.

(*f*) *Upshifts from fifth through ninth speeds*

These will continue to be selected by appropriate manipulation of the upshift valve 233 and the shift initiated by the movement of the shift valve 235 in the manner above set forth and no further detailed description thereof will be necessary. Here the leftward position of the rod 209 holds the valve 214 open and line 403 being open to the atmosphere permits valve 216 to open, whereby the inhibitor R remains inoperative until the next range shift.

(*g*) *Downshift from ninth through fifth position*

Thus far, in describing the upshift operation of the apparatus embodying the present invention, there has been no essential difference from the operation followed in connection with previously known apparatus and systems. However, in coming now to the downshift sequence, the difference in operation in the present invention as compared to that of previously kown systems and apparatus is brought out.

However, the downshift from ninth through fifth position is sufficiently similar to the downshift from fifth to fourth position, that the steps thereof will be sufficiently understood merely by description of the shift from fifth to fourth position and accordingly reference is made to the description appearing below relative thereto.

(*h*) *Downshift from fifth to fourth position*

Downshifting from fifth to fourth position is selected, as are all other downshift movements, by depression of the downshift preselect valve 234. This energizes the cylinder 306 which acts through the pawl 302 to move the rotor 244 one increment counterclockwise as appearing in FIGURES 4*a*–4*d*, inclusive. This causes the corner 291 of the notch 286 of rotor 244 to engage the leg 283 of the rocker 273 and rotate it counterclockwise into the position shown in FIGURE 4*c*. Simultaneously the port 257 is now connected to the line 377 and the port 261 in the circle II of valves is connected to the port 263*a*. Line 391 and therefore port 261 being connected to constant supply, this immediately pressurizes cylinder 107 of the detector unit D. Simultaneously line 270 also being connected to constant supply, this pressurizes through port 277*a* of the rocker 273 the line 403 and thereby pressurizes the port 222 of the inhibitor R, thereby moving the plunger 216 thereof into its upper position for blocking the port 223. The line 404 is by this operation depressurized so that the plunger 214 is free to move downwardly away from the port 219.

Pressurizing of the line 346 by the actuation of the downshift valve 234 moves the core of supply relay valve 83 rightwardly. This connects the line 351 to exhaust to insure the exhausting of the several lines associated therewith.

The actual shifting movement is again initiated by the depression of the shift valve 235 which provides a pulse of pressure fluid through line 205 to move the core of valve 317 rightwardly. This, as before, pressurizes both of the lines 78 and 356. The core of valve 76 being held rightwardly by the spring 80, pressurizing line 78 energizes the clutch cylinder 23 and opens the clutch 19. Simultaneously pressurizing of the line 356 pressurizes the neutral cylinder 46 and moves the main transmission into its neutral position.

Movement of the main transmission into its neutral position moves the core of valve 83 leftwardly and thereby pressurizes line 351 and the several parts connected therewith, namely, the rightward side of clutch relay 76, port 257 in the rotor 244, port 280 in the rocker 273 and the rightward side of detector valve 123. Pressurizing the rightward side of the clutch relay 76 moves the core 76*a* thereof leftwardly and thereby depressurizes the clutch cylinder 23 for re-engagement of the clutch. Pressurizing of the port 280 pressurizes the upper end of the auxiliary relay valve 84 and moves same into its downward position whereby the constant pressure at port 367 pressurizes line 372 which pressurizes the leftward end of the auxiliary shift cylinder 62. This urges the auxiliary transmission sleeve 58 rightwardly.

Pressurizing of the line 356 also pressurizes the line 405 which pressure appearing at the port 221 is blocked by the plunger 216 which is in its upper position as above described.

When the main transmission reaches neutral position, pressure is released from the direct connection clutch teeth of the auxiliary transmission and the sleeve 58 is enabled to move rightwardly in response to the pressure at the leftward end of the auxiliary shift cylinder 62. Upon such rightward movement the synchronizer 55 is engaged and as soon as synchronization is completed the rightward shift of the auxiliary transmission is completed. The completion of such rightward shift causes the cam **211*b* to push the plunger 216 downwardly and thereby connect port 221 with port 223 for pressurizing the line 400 and thereby pressurizing the leftward end of the detector valve 123. This moves the core 132 of valve 123 rightwardly. Because, in anticipation of the lower gear to be engaged, the gear 97 rather than the gear 96 is now connected to the shaft 92, the shaft 112 is caused to rotate more rapidly than the sleeve 126 and the gear 131 driven thereby. Thus, the splined member 118 and the parts by which the blockers are driven take positions opposite to those shown in FIGURE 12 and instead the tooth alignments thereof appear as shown in FIGURE 15. Under the urging of pressure fluid from the line 400, the sleeve 119 moves rightwardly until it is stopped by the downshift blocker 174. In this position the passageway 407 does not align with the port 364 and accordingly no pressure appears in line 394 to energize the countershaft brake nor is there any pressure appearing in line 363 to move the core 82 of the clutch relay 76 rightwardly. Accordingly, the countershaft brake remains disconnected and the clutch remains connected, whereby the operator may use the engine to accelerate the input shaft 1** of the main transmission in the usual manner.

With such acceleration, synchronization of the fourth speed gears in the main transmission is approached. In this instance, and unlike the arrangement shown in Patent No. 2,943,719, the blocker 174 is being driven by the gear 131 at the same speed as the blocker 167 and hence it will reach synchronism with the sleeve 119 only when the engine connected gear-to-be-engaged is being driven at a faster rate than the main shaft gear-to-be-engaged. Thus, the speeds of the gears-to-be-engaged pass through and beyond synchronism and, as shown in FIGURE 3, synchronism between the blocker 174 and the sleeve 119 is attained at a trigger speed indicated by the point $S_3$ which in FIGURE 3 represents the same relative speed with respect to sleeve 119 as that which occurs at the point of synchronization and indicated as the trigger speed $S_1$ utilized in connection with an upshift.

Since for obvious reasons this, as shown in FIGURE 14, will align the teeth of the splined part 118 with the teeth of the downshift blocker 174, the sleeve 119 will accordingly move rightwardly through the blocker 174 to a new blocking position against the upshift blocker 167. Because of the slight time lag required for the parts to react to the signal given when the sleeve 119 moves rightwardly through the blocker 174 to and against the blocker 167, the speed of the engine connected gear will rise slightly above the trigger speed $S_3$ as indicated by the portion E in FIGURE 3 of the line representing the speed of the engine connected gear. As the result, however, of applying the countershaft brake and opening the clutch, the speed of such engine connected gear is again brought downwardly and this time approaches the point of synchronism from a higher speed in the same manner as it approaches said point in an upshift. When it again reaches said trigger speed as indicated by the line $S_1$ in FIGURE 3, the blocker 167 will unblock in the manner and for the same reasons as above described in connection with the synchronizing of an upshift, the teeth thereof will become aligned with the teeth of both the parts 118 and blocker 174 and the sleeve 119 can move to its full rightward position. This in the same manner as above described in connection with an upshift will connect the passageway **407*a* with the port 362** resulting in the release of the countershaft brake, completion of the selected shift and re-engagement of the clutch.

This completes the shift into fourth speed.

(*i*) *Reverse*

For reverse operation, the downshift valve 234 will be further actuated until the port 258 is in register with the port 384.

This being in effect another start from a standstill position, the operator will now actuate the shift valve 235 to return the main transmission to neutral condition and then actuate the start valve 232 and the sequence will proceed in the same manner as above described for a start from standstill into first gear position.

The rocker 273 being in its FIGURE 4*c* position, the auxiliary will be in its reduction position as above described in connection with first gear position.

MODIFICATION

In the foregoing embodiment it has been assumed that the trigger speed $S_3$ (FIGURE 3) at which the downshift blocker 174 becomes unblocked is the same as the trigger speed $S_1$ at which the upshift blocker becomes unblocked to initiate the shifting operation. This will normally be satisfactory for the reasons above stated.

However, it will be recognized that these trigger speeds need not in all cases be the same and that in some instances there are advantages in having them different. For example, while the present system insures a smooth shift in a downshift sequence, it requires slightly more time than in previous practice to accomplish inasmuch as the shift signal is given at the point $S_1$ following the point of initial synchronization of the parts to be engaged instead of at the point $S_2$ (FIGURE 2) utilized in the prior practice which is somewhat ahead of $S_1$. Normally this extra time is very slight and can be tolerated in view of the advantages obtained by bringing the gears together from an upshift direction with its consequent relatively low rate of approach to synchronization point as compared to the disadvantages of bringing the gears together from a downshift direction with its relatively high rate of approach to the point of synchronism, all as above discussed in more detail. Nevertheless, this time can be diminished somewhat within the scope of the present invention by modifying the detector unit to provide a signal at a speed $S_4$ which is selected to be very close to the point of synchronization of the engine connected gear and the main shaft connected gear and at a point slightly less than the speed $S_1$ in which the shifting is completed. In this way, the application of the countershaft brake and the opening of the clutch is initiated at a second trigger speed $S_4$ selected at a slightly lower speed than the first trigger speed $S_1$ and accordingly the maximum speed within the part "G" of FIGURE 16 will not rise quite as high as the corresponding part "E" of FIGURE 3 (superimposed in a broken line E' in FIGURE 16) and consequently said speed can be brought back down to the first trigger speed $S_1$ in which the shift is completed somewhat more quickly. The saving in time by the embodiment of FIGURES 16 to 19 is illustrated by the increment indicated as "X" in FIGURE 16.

Conceivably, the relative speeds of the several gears can also be detected so that the second trigger speed indicated by the line $S_4$ of FIGURE 16 is either at or even slightly ahead of the point of synchronization of the engine connected gear and the main shaft connected gear provided only that the engine connected gear will in all instances rise after the occurrence of the signal at $S_4$ to a speed above the first trigger speed $S_1$ in order that the engine connected parts can approach synchronization speed in response to the action of the countershaft brake from a speed faster than $S_1$ and thereby proceed as in an upshift sequence.

It will be recognized that the system of FIGURES 2 and 3 represents a special case within the general system of FIGURE 16.

While all of the foregoing discussion has been in terms of range shifting auxiliary ratios, it will be apparent that both the principles and apparatus may be readily modified to provide a "splitter" type of auxiliary. Since the manner of doing this will be apparent to those skilled in the art in the light of the foregoing, a detailed description of this type of apparatus is unnecessary and will be omitted with the understanding, however, that the invention applies also thereto.

Although a particular preferred embodiment of the invention has been disclosed above in detail for illustrative purposes, it will be understood that variations or modifications of such disclosure, which lie within the scope of the appended claims, are fully contemplated.

What is claimed is:

1. In a system for controlling the downshifting of change speed, shiftable, toothed elements, the combination comprising:

first and second shiftable, interengageable, toothed elements;

detector means sensing the relative rotational velocities of each of said toothed elements;

first signal means responsive to said detector means for actuation when, and only when, said first toothed element is running faster than the second toothed element, is diminishing its speed to a point of synchronism with said second toothed element, and reaches a first trigger speed occurring before a point of synchronism is reached whereupon said first signal means will give a shift signal to initiate interengaging of said toothed elements;

second signal means responsive to said detector means for actuation when said first toothed element is running at a rotational speed slower than said second toothed element but is increasing its said speed with respect thereto and speed diminishing means responsive to actuation of said second signal means to bring about a diminishing of the rotational speed of said first toothed element, said diminishing occurring a discrete time interval after said actuation, and said second signal means including means so relating same to said detector means that said second signal means are operative at a second trigger speed selected with respect to the relative speeds of said first and second toothed elements that during said time interval the speed of said first toothed element will overrun to a value higher than the said first trigger speed after which said speed diminishing means will diminish the speed of said first toothed element to said first trigger speed and actuate said first signal means to complete a shift.

2. The device defined in claim 1 wherein said second trigger speed is selected at a point near synchronism between the rotational speeds of said first and second toothed elements.

3. The device defined in claim 1 wherein said second trigger speed is selected to occur only after said first toothed element passes synchronism with the speed of said second toothed element and is rotating faster than the speed of said second toothed element.

4. In a control device for a pair of change speed shiftable and interengageable, first and second, toothed elements, at least one thereof being serially connected to both clutch and brake means, the combination comprising:

a first detecting means sensitive to the speed of rotation of said first toothed element;

second detecting means sensitive to the speed of rotation of said second toothed element;

a signal generator and means urging same in a given direction during a shifting operation and into at least three separate positions; interpreting means actuable by said signal generator when in said first position for actuating said clutch means to effect engagement of said clutch and de-energize said brake means, when in said second position to disengage said clutch means and engage said brake means and when in said third position to disengage said brake means, effect a shift of said toothed elements and re-engage said clutch;

first positioning means co-operating with said detecting means for placing said signal generating means in said first position when said first toothed element is increasing in speed with respect to said second toothed element and prior to synchronism therebetween, second positioning means reacting to the substantial attainment of synchronism between said toothed elements for placing said signal-generating means in its said second position and third positioning means reacting to said detecting means upon the approaching of the speeds of said toothed elements toward each other from the same direction and slightly before synchronism therebetween for placing said signal generator in its third position;

whereby upon increase in speed of an engine connected toothed element in consequence of a downshift procedure the signal-generating device will occupy its first position prior to the substantial attainment of synchronism between said parts, it will occupy said second position as synchronism between said parts is substantially attained to apply a braking device to said engine connected toothed element and said signal-generating device will occupy said third position as said engine connected toothed element is slowed to a point approaching synchonism with said second toothed element for giving a shift-effecting signal whereby to complete said shift as first and second toothed elements approach synchronism with diminishing speeds.

5. In transmission control means for controlling the shifting of first and second interengageable toothed elements, one thereof being connected serially to clutch and brake means, the combination comprising:

a first rotating detector member rotatable at a speed bearing a fixed proportion to the speed of said first toothed element;

a second rotating detector member rotatable at a speed bearing a fixed proportion to the speed of said second toothed element;

a signal-generating rotatable slide movable axially between said two detector elements;

first and second blocker means responsive incrementally to the relative speeds of said detector members for determing the extent of axial movement of said signal-generating means, said blocker means arranged to cause said signal-generating means to occupy one of at least three separate positions;

means actuable by said signal-generating means in said first position to actuate said clutch means for effecting engagement of said clutch and de-energizing said brake means, in said second position to disengage said clutch means and engage said brake means and in said third position to disengage said brake means, effect a shift of said toothed elements and re-engage said clutch;

means urging said signal-generating slide in one axial direction during a shifting sequence of said toothed elements, the extent of movement of said signal-generating element being determined by the relative position of said blocker means;

said first blocker means cooperating with said detector means for placing said signal-generating means in said first position when said first toothed element is increasing in speed with respect to said second toothed element and prior to synchronism therebetween;

said first and second blocker means reacting jointly in one manner to the substantial attainment of synchronism between said toothed elements for placing said signal-generating means in its said second position;

and said first and second blocker means reacting jointly in another manner upon the approaching of the speeds of said toothed elements toward each other from the same direction and slightly before synchronism therebetween for placing said signal generator in its third position;

whereby upon increase in speed of an engine connected toothed element in consequence of a downshift procedure the signal-generating device will occupy its first position prior to the substantial attainment of synchronism between said parts, it will occupy said second position as synchronism between said parts is substantially attained to apply a braking device to said engine connected toothed element and said signal-generating device will occupy said third position as said engine connected toothed element is slowed to a point approaching synchronism with said second toothed element for giving a shift-effecting signal whereby to complete said shift as first and second toothed elements approach synchronism with diminishing speeds.

6. In a shift control mechanism for interengageable and shiftable toothed elements, such as in an automotive-type transmission, the combination comprising:

a detector unit having a pair of meshable gears of the same ratio as said toothed elements, a first thereof driven at a speed in first selectable proportion to the speed of one of said toothed elements and a second thereof being driven at a speed in second selectable proportion to the other of said toothed elements;

first and second speed sensing means, said first sensing means being driven from said first gear and said second sensing means being driven from said second gear at a rate slightly faster with respect to said second gear than said second selectable proportion;

signal means reacting to said sensing means for giving a synchronizing signal when the speed of said first sensing means approaches that of said second sensing means regardless of whether said approach is from a higher or lower rate of speed and said signal means giving a shift signal when the speed of said first sensing means approaches the speed of said second sensing means but only when said approach is from a direction at which the first sensing means is running faster than the second sensing means;

whereby a synchronizing signal for slowing of said first toothed element with respect to said second toothed element may be given on either an upshift or a downshift but only when said first toothed element is running at a speed close to that of said second toothed element and the shift signal is given only when the speeds of the toothed elements and their respectively connected sensing means approach each other from an upshift direction.

7. The device defined in claim 6 wherein said first sensing means is a rotatable gear carrying a pair of blockers frictionally related thereto, and said second sensing means includes an axially slidable rotatable sleeve, means urging said sleeve toward said gear during a shifting operation, said blockers permitting incremental axial movement of said sleeve in response to such urging in accordance with the relative speeds of said first and second sensing means and means deriving said signals from the axial position of said sleeve.

References Cited by the Examiner

UNITED STATES PATENTS 2,943,719 7/1960 McNamara -------- 74—339 X

DON A. WAITE, *Primary Examiner.*